Patented Mar. 14, 1939

2,150,283

UNITED STATES PATENT OFFICE 2,150,283

METHOD OF AND MEANS FOR TREATING CITRUS FRUITS

John R. MacRill, Whittier, Calif., assignor to California Fruit Growers Exchange, Los Angeles, Calif., a corporation of California No Drawing. Continuation of application Serial No. 704,054, December 26, 1933. This application November 16, 1937, Serial No. 174,823

6 Claims. (Cl. 99—168)

This invention relates to improvements in the treatment of citrus fruits, such as lemons, for the purpose of more successfully and economically maintaining the fruit in the most desirable condition during that period of time which elapses between the picking of the fruit in the grove and the consumption of the same by the ultimate consumer. Such treatment or processing presents a number of problems. One of the problems is the conditioning of the fruit in such manner that it reaches the market in the most satisfactory and successful condition, i. e., without shrinkage, withering or decay and with a desirable natural color.

Fresh fruit from the grove is very seldom clean because groves are extensively cultivated and sprayed for the control of various insects, fungi and the like. As a result, the fruit carries quantities of dust, dirt, grime, smudge, etc. This foreign matter must be removed so that the surface of the fruit is clean and in an obviously edible condition. Although oranges are customarily picked when they are mature and suitable for substantially immediate consumption, the practice involved in the handling of lemons varies somewhat.

A considerable part of the lemon crop is ordinarily picked at a stage when it is not yet fully colored. Lemon trees bloom and set fruit to a certain extent throughout the year, although the majority of the bloom and fruit setting generally occurs in the spring months. In view of the continuous blooming of the trees, it is necessary to pick lemons throughout the year. The most satisfactory lemon is obtained by picking the fruit while it still has a green color but after it has reached the desired size, and then curing this fruit in lemon storage rooms or basements for a period of from two to three weeks to two or three months. During this curing or storage period, the green lemons change to the desired yellow color and in addition a certain internal curing takes place which makes the juice available.

When lemons are being picked or clipped, size is practically the only criterion and all lemons above a predetermined size are picked. Lemons which have reached a yellow coloration on the tree are also picked regardless of size. The color of the lemon at the time of picking is very closely related to the length of time the fruit may be held in storage; lemons having a yellow color at the time of picking are generally held in the storage rooms only a week or two before shipment. Silver-colored lemons can be held a month to six weeks; light green lemons, about six to ten weeks; and dark green lemons from eight to twelve weeks. Occasionally, when a very active market exists and it is desirable to ship the lemons as soon as possible after picking, the natural coloring process is accelerated by means of ethylene gas or the like.

It has been discovered that lemons of different color react differently to the application of a waxy coating thereon. The prior waxing methods by atomization of hot wax or by the application of hot or cold wax by means of brushes, produce very irregular results. When a comparatively small amount of fruit is passed through the atomizing or hot wax chamber and brushes, there is a comparatively large amount of waxy material applied to the fruit, and when a large amount of fruit is passing, a much lesser amount of wax is available to be applied to each fruit. As a result, it is extremely difficult, if not impossible, to regulate the storage characteristics of such lemons. Furthermore, in these prior processes it has been found necessary to first wash the lemons to remove the adherent grime, smudge, and the like (such washing being either with or without the use of mold-retarding or inhibiting agents), then dry the lemons, and finally apply the wax thereto. This amount of handling is not only time-consuming but has a tendency to injure the fruit and facilitate the development of decay in storage.

The present invention contemplates the elimination of one of these steps, namely, the drying step, and the application of a wax in regulatable quantities and in the form of an aqueous emulsion. The invention also contemplates the provision of an aqueous wax emulsion which is stable and which can be used in the treatment of wet fruit for the purpose of imparting a suitably regulated, uniformly distributed film of wax thereto.

An object of this invention, therefore, is to disclose and provide a treating or waxing agent in liquid form capable of uniformly and regulatably distributing a suitable quantity of wax over the surface of citrus fruit.

Another object is to disclose and provide an aqueous, wax or paraffin-containing emulsion.

A further object is to disclose and provide a method of treating citrus fruit, particularly lemons, whereby they may be prepared for storage and shipment with the minimum amount of equipment, labor and consumption of time.

A still further object is to disclose and provide a method of treating lemons whereby more uniform and regulatable results may obtain, irrespective of variations in color of the lemons as picked.

These and other objects, uses and advantages of the invention will become apparent to those skilled in the art from the following detailed description of a preferred treating solution or emulsion, mode of application, and adaptation to the treatment of lemons. It is to be understood that the following description is primarily directed to preferred treating agents, proportions and conditions, and that numerous changes and modifications can be made without departing from the invention. It is further to be understood that, unless otherwise indicated, parts and percentages given herein are on a weight basis.

I understand that the following values are approximately correct for the weight of one gallon of each of the liquids given:

|  | Pounds |
|---|---|
| Citrus terpenes | 7.0 |
| Cottonseed oil | 7.7 |
| Kerosene | 6.7 |
| Oleic acid | 7.3 |
| Pine oil | 7.2 |
| Stearic acid | 7.1 |
| Triethanolamine | 9.3 |
| Water | 8.3 |

As hereinbefore stated, this invention contemplates the use of an aqueous wax emulsion to be applied to citrus fruit such as lemons, for the purpose of forming thereon a preservative and/or protective coating which will retard shrinkage and also decay such as blue or green mold, Alternaria, etc. A typical example of the preferred emulsion, which has been found to be well suited, comprises the following materials in approximately the amounts indicated:

|  | Parts |
|---|---|
| Paraffin | 55.3 |
| Carnauba wax | 6.8 |
| Vegetable oil (cottonseed) | 9.8 |
| Fatty acid (oleic) | 18.3 |
| Triethanolamine | 9.8 |

These ingredients are melted together and about 110 parts of a suitable hydrocarbon solvent are added, the mixture being heated or warmed until a clear liquid results. Hydrocarbon oil, extensively marketed under the name "kerosene", has been found entirely satisfactory, although any solvent of approximately the same properties may be employed.

The above mixture, termed hereinafter "wax-solvent mix", may then be used in the preparation of the final emulsion. It has been found necessary to use soda ash in the aqueous phase of the final emulsion. From about 1 to 30 parts of the wax-solvent mix are heated to approximately 140° F.–170° F. and then added to 99–70 parts of water in which there has been dissolved about 1% of soda ash. The water is preferably warmed to a temperature of 90° F.–100° F. before the addition of the wax-solvent mix thereto. Preferred results are obtained when from 5 to 9 parts of the wax-solvent mix are added to 90–94 parts of the water–soda ash solution. The soda ash content may be suitably varied from 0.25% to 2%.

It is particularly pointed out that in order to produce purely stable emulsions of the type embraced by this invention, it is distinctly necessary to have soda ash or an equivalent sodium salt present in the final emulsion. When ordinary waters are being used, particularly those containing a high percentage of calcium, it may be desirable to employ a small amount of sodium chloride (about 2 ounces per 100 pounds of water).

In addition to the ingredients specifically mentioned hereinabove as constituting the wax stock from which the emulsion is eventually made, citrus terpenes may be added in small quantities, it having been found that such terpenes have highly desirable mold-inhibiting and decay-preventing properties. Not more than 0.25% of citrus terpenes need be used (on weight of constituents composing the wax stock minus the solvent). Ordinarily, not more than 0.125% is sufficient. Pine oil may be substituted for citrus terpenes. In order to set out more definitely the exact make-up of the emulsions here involved, the variations of proportions found satisfactory are tabulated hereinbelow:

*Wax stock minus solvent*

|  | Typical amount | Preferred range |
|---|---|---|
|  | Percent | Percent |
| Paraffin | 55.3 | 40 to 70 |
| Carnauba | 6.8 | 4 to 10 |
| Vegetable oil (cottonseed) | 9.8 | 6 to 12 |
| Oleic acid (stearic acid) | 18.3 | 15 to 22 |
| Triethanolamine | 9.8 | 7 to 11 |
| Pine oil or citrus terpenes | 0.0 | 0 to 0.125 |
| Total | 100.0 |  |

*Wax stock with solvent*

|  | Typical amount | Preferred range |
|---|---|---|
|  | Percent | Percent |
| Wax stock | 47.5 | 40 to 55 |
| Solvent | 52.5 | 45 to 60 |
| Total | 100.0 |  |

*Final wax emulsion*

|  | Typical amount | Preferred range |
|---|---|---|
| Wax stock | 2.4% | 0.8% to 4.32% |
| Solvent | 2.7% | 0.9% to 4.86% |
| Soda ash | 1.0% | 0.25% to 1.25% |
| Additional soap | (1) | (1) |
| Water | Balance. | Balance. |
| Total | 100.0% |  |

[1] A suitable amount.

It is to be understood that quantities both above and below the preferred range may be employed.

The citrus fruit to be treated in accordance with the process is preferably first cleansed and then brought into contact with the wax emulsion in such manner as to completely and copiously wet the same. Such contact may be accomplished in a number of ways, although it is preferred to do this by passing the fruit by means of a roller conveyor across an open tank containing the final emulsion. The wax emulsion is brought from the tank and sprayed onto the fruit from above at the entering end of the conveyor. As the fruit progresses to the exit, any excess emulsion will drip off and return to the tank. Inasmuch as the entering fruit is wet and as the wax content of the emulsion becomes depleted by adherence to the fruit, there is a definite tendency for the tank of wax emulsion to become diluted. It has been found that this dilution tendency may be overcome by periodically supplying the tank of wax emulsion with a more concentrated or make-up emulsion containing, for example, 10% or 15% of the wax-solvent mix. In this manner, the final emulsion may be kept up to the desired strength without the necessity of periodically interrupting the operation and without varying to any material extent the wax concentration existing in the final emulsion and being supplied to the fruit.

It will be observed that a very uniform amount of any given emulsion will remain on the fruit. The amount of waxy ingredient supplied to the fruit may be readily regulated by increasing or decreasing the amount of wax carried by the treating emulsion.

Attempts have been made to wax fruit requiring coloring treatment (by sweating or ethylene treatment) prior to such coloring treatment. The object of the preliminary waxing was to eliminate excessive shrinkage during the sweating or coloring operation. The waxy coating, however, influences the rate of response of the fruit to the coloring treatment and because of the non-uniform applications in the amount and/or thickness of wax, the fruit necessarily gave very erratic results in the coloring step of the conditioning process. It has been found that the present process gives absolute uniformity in the application of waxy material to the fruit and highly uniform coloring results may be achieved either with fruit which is waxed before the first coloring or with fruit which is first colored, then waxed, and a certain small portion of it sent back for further coloring. Those skilled in the art will appreciate the importance of such result.

Attention is also called to the fact that when so-called weak lemons, such as tree-ripes, have a heavy wax coating applied thereto, a large percentage of internal decay, such as Alternaria, occurs. Such increased decay is often greater in extent than that which takes place when the same tree-ripe lemons are unwaxed.

It has also been found that heavier wax application on strong lemons, such as the light green or dark green lemons, results in a very material retardation of the color development, although less Alternaria decay occurs than in lemons of the same color but having a lighter or no wax coating. As a result, it is necessary that the amount of wax applied to the lemons be regulated. Such regulation is not possible today by any method used heretofore. The packing house operator knows, for example, that at certain times of the year he will be storing light green and dark green lemons for a short period and he does not want to retard the coloring development to the extent that they will not be ready to ship when he desires to ship. By means of this invention, the operator may cause the application of but a light coating of wax, thereby not retarding the color development.

Furthermore, this invention contemplates a process in which those lemons which are brought to the packing house before they are substantially mature and ready for consumption may be passed directly from the wax emulsion treating into storage without any brushing or rubbing after the wax application. It is not necessary to the successful operation of the process, that the waxed fruit be dried or partially dried before being placed in boxes for storage, although this may be done if desired.

If the lemons after washing and before being placed in storage have a coating of wax applied by any of the prior methods, then it is necessary to dry them after washing and before applying the wax and this entails considerable equipment not necessary with the aqueous wax emulsion method described herein.

It has been found that when clean storage boxes are used, mechanical adhesion of dust and dirt to the moist surface of the fruit is thereby prevented, the wax emulsion coating dries in storage, and the fruit is found to have a very uniform wax coating. Moreover, it has been found that as the emulsion dries on the surface of the fruit and leaves the fruit coated with wax, it produces a very desirable appearance and the fruit does not require further treatment by polishing.

Another important aspect of my invention is that the lemons may be held in storage a considerably longer period when waxed by this method than it is possible when they are untreated or treated with other waxing processes. The great commercial importance of this advantage will be appreciated when it is realized that the peak of production of lemons usually occurs from December to March whereas the peak of consumption is generally from June to September.

Again, it is of advantage to pick green colored lemons in winter or early spring as these lemons are of greater vitality, have received less scars and injuries from wind, sun, etc., and cure to better advantage both as to appearance and condition.

Actual tests have shown that from 25% to 45% more boxes of fruit may be packed out from a given number of boxes of fruit treated in accordance with this invention and placed in storage than from the same number of untreated fruit from the same lot subjected to the same storage condition.

Although certain materials have been very specifically mentioned hereinabove, it is to be understood that other substances may be used in their stead. For example, beeswax may be substituted for paraffin wax and carnauba wax. Although cottonseed oil is the preferred vegetable oil, other common vegetable oils may be used, due account being taken for known differences in properties. Of the fatty acids, oleic acid, either in the form of the technical grade known in the art as "Red oil" or the refined grade known as "Triple distilled", may be used. Stearic acid is an acceptable substitute.

By the term "triethanolamine", reference is made to the commercial product which apparently contains diethanolamine and monoethanolamine in minor quantities. Any one of the pure substances of this group gives equally satisfactory results, the proportions being varied somewhat.

It should be pointed out that the invention is by no means limited to lemons, since in the preparation of oranges for the market it is highly desirable that a smooth, waxy coating be applied thereto. This may be accomplished by the present invention to better advantage than by any other process known heretofore. In treating oranges by this process, it may be desirable to subject the fruit to a drying step. If desired a polishing step may be included.

This application is a continuation of my co-pending application Serial No. 704,054, filed December 26, 1933.

I claim:

1. In a method of processing citrus fruit, the step of applying substantially uniform quantities of wax thereto in regulated amount by contacting washed fruit with an aqueous emulsion containing from 0.3% to 3.5% of waxy constituents, not more than about 15% of hydrocarbon solvent, an ethanolamine soap, and from 0.25% to 1.25% of soda ash, the balance consisting essentially of water and then introducing the fruit, while still wet, into storage and permitting the surfaces of the fruit to dry during such storage.

2. In a method of processing citrus fruit, the step of applying substantially uniform quantities of wax thereto in regulated amount by contacting washed fruit with an aqueous emulsion containing from 0.3% to 3.5% of waxy constituents, not more than about 15% of hydrocarbon solvent, and from 0.25% to 1.25% of soda ash, an ethanolamine soap, and citrus terpenes in amount not greater than 0.5%, the major proportion of the emulsion consisting of water and then introducing the fruit, while still wet, into storage and permitting the surfaces of the fruit to dry during such storage.

3. An emulsion suitable for applying a waxy coating to citrus fruit comprising 0.3% to 3.5% of waxy constituents, not more than 15% of a hydrocarbon solvent, an ethanolamine soap, and about 1% of soda ash, the balance consisting essentially of water.

4. An emulsion suitable for applying a waxy coating to citrus fruit comprising 0.3% to 3.5% of waxy constituents, 0.1% to 0.5% of triethanolamine soap, 0.25% to 1.25% of soda ash, not more than 15% of hydrocarbon solvent, and less than 0.5% citrus terpenes, the balance being composed of water.

5. A method of processing lemons which comprises washing fresh lemons to remove foreign matter, contacting the washed and wet lemons with an aqueous emulsion containing from 0.3% to 3.5% of waxy constituents, not more than 15% of hydrocarbon solvent, from 0.25% to 1.25% of soda ash, and an ethanolamine soap, then introducing the fruit while still wet into storage, and permitting the surfaces of the fruit to dry during such storage.

6. An emulsion suitable for use in applying a waxy coating to citrus fruits whereby it is possible to place the fruit still wet with said emulsion in storage and there permit the surfaces thereof to dry, said emulsion comprising a total of from 0.3 to 3.5% of paraffin and carnauba wax, vegetable oil, fatty acid and triethanolamine, kerosene in amount not more than 15%, about 1% of soda ash, and from 65% to 98% of water.

JOHN R. MacRILL.